Jan. 29, 1929.   M. J. OCHES   1,700,510
DOUGH MIXER
Filed Dec. 28, 1925
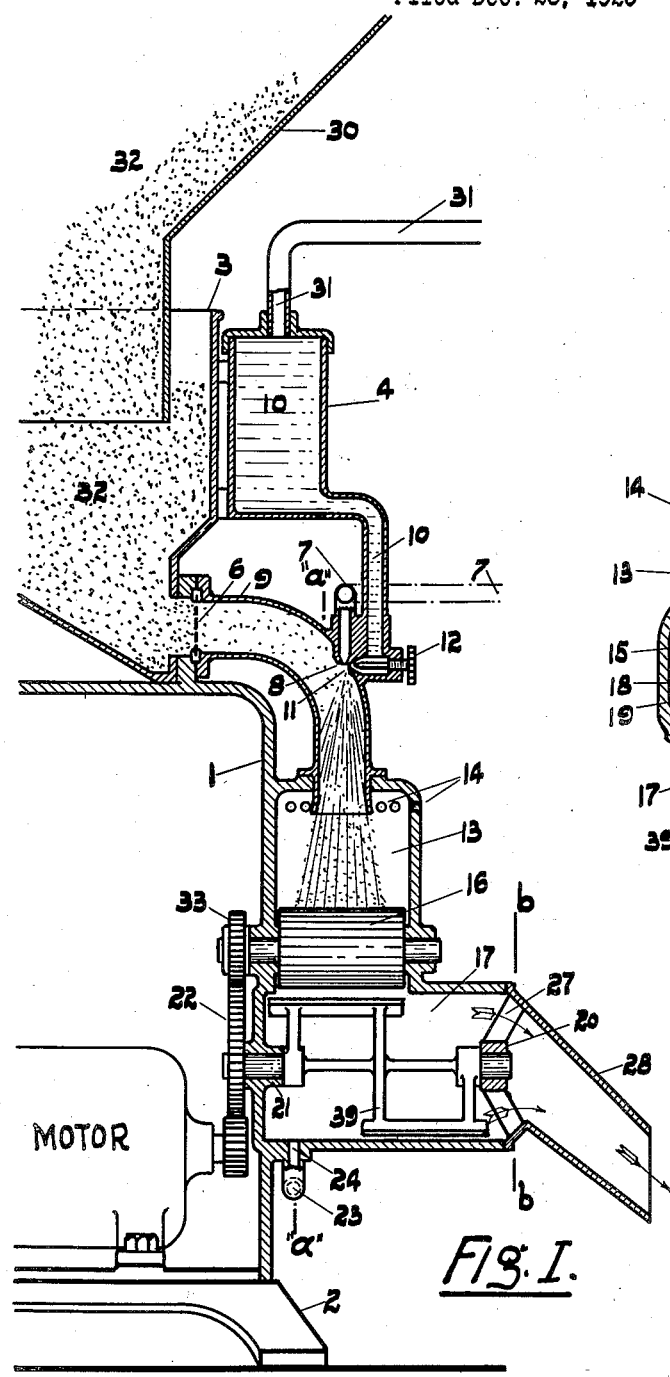
Fig. I.
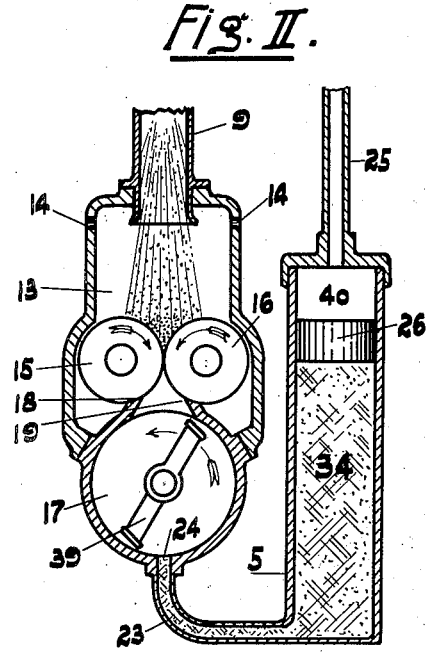
Fig. II.
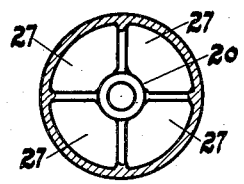
Fig. III.
INVENTOR.
BY
ATTORNEY.

Patented Jan. 29, 1929.

1,700,510

UNITED STATES PATENT OFFICE.

MAXIMILIAN JOSEPH OCHES, OF CLEVELAND, OHIO.

DOUGH MIXER.

Application filed December 28, 1925. Serial No. 78,036.

The new device relates to an invention in dough mixing machines in which the process of mixing flour or other powdered material with liquid and semi-liquid substances is continuous and automatic.

Heretofore, the usual practice in mixing dough by machinery has been to place a measured quantity of flour and liquid into a mixer and then to agitate or knead the mass for a certain length of time and thereafter to remove it, and cut it into sections of proper size. This necessitates a large machine to mix a batch of an appreciable size, and moreover requires a high consumption of power to operate the apparatus.

The objects of the new invention are first to provide a simple and effective means to deliver dough automatically in a continuous flow, second to afford a more thorough method of mixing, third to render the process of mixing more expeditious and labor-saving, fourth to eliminate entirely unsanitary hand labor or large and expensive machines.

One form of the invention is illustrated in the accompanying drawing in which Fig. I is a vertical section of the operating part of the machine, Fig. II a vertical section of a part of the machine on the line a—a of Fig. I, and Fig. III a vertical section of a part of the machine on the line b—b of Fig. I; all figures are shown diagrammatically.

I carry out my invention by causing a thorough commingling of flour and liquid, such as brine, in relatively small quantities to make a pasty mass, which is then pressed and kneaded or mixed to the desired degree. The flour moves continuously from a bin past a liquid atomizer, while the compressing and subsequent mixing or kneading operations are carried on progressively with a relatively small quantity of material. Thus, a relatively low power consumption is required to operate the apparatus and the entire device may comprise a relatively small compact machine.

The casing 1—Fig. I—with its legs or base 2 secured to the under side of same and shown on the drawing in half only constitutes the framework of the machine and at the same time the housing of the gears (22, 33), motor and air compressor (last named not shown on drawing). The hopper 3 and the containers 4 and 5 (Fig. I and Fig. II) hold the ingredients to be mixed, which in the case to be described herein consist of flour 32, brine 10, and lard 34.

The supply to hopper 3 is maintained from bin 30, shown on drawing in part only, while the container 4 receives its additional supply through pipe 31 from a supply-tank (not shown on drawing). An auxiliary supply to container 5—Fig. II—might be added in a similar manner, but is shown without such.

In the preferred form of construction the flour is caused to flow through a restricted passageway such as a delivery tube 9 and to commingle with atomized liquid 10 which is adapted to enter the tube intermediate the ends thereof. By directing the air nozzle 8 downwardly, the liquid is not only atomized, but the flour is drawn downwardly from the bin and is thoroughly mixed during the passage through the tube. Below the outlet of the delivery tube, provision is made for pressing the pasty mass together, and also for kneading it progressively as fast as it may be ejected from the delivery tube.

The operation of the machine is substantially as follows:

The flour 32 in hopper 3 is drawn through screen 6 by the suction caused behind and (or) following a forced stream of air, supplied through pipe 7 with aperture 8 flowing within tube 9. While the screen 6 serves to break up any small lumps in the flour, the forced air also atomizes the brine 10 issuing from a nozzle 11 in proximity with aperture 8 which is regulated by a screw 12 in more or less obstructing the opening in the nozzle 11.

As the flour 32 is thus drawn through the same tube (9) as the atomized brine (10), it will necessarily come into intimate contact with same as it enters the chamber 13—Fig. I and Fig. II. Relief-holes 14, connecting with the outside air, are suitably arranged to avoid undue air pressure in the chamber 13 in order to facilitate the rapid flow of the mixture onto the rollers 15 and 16 (Fig. II) which complete the contact between flour and brine by pressure, and which force the dough thus formed into the lower mixing chamber 17 (Fig. I and Fig. II) any adhering dough is scraped off the rollers by the scrapers 18 and 19.

In the chamber 17 the mixing process is completed by means of the mixing paddle 39 rotating inside the mixing chamber 17 and pivoted in the bearings 20 and 21 (Fig. I and Fig. III) and operated by the gear 22 fixed to same, simultaneous with the gears 33 fixed to the ends of the rollers 15 and 16—Fig. I and Fig. II—and by means of the motor shown on the drawing, Fig. I.

When required by the desired nature of the dough,—lard, butter or any other substance may be added, preferably under pressure, from the supply in the tank 5—Fig. II—through the tube 23 and its aperture 24—Fig. I and Fig. II—in the rear of mixing chamber 17. The pressure in this case is supplied through compressed air entering the chamber 40 of the tank 5 through pipe 25 forcing the plunger 26 downward.

After the mixing process is thus accomplished the finished dough is emptied through the openings 27—Fig. I and Fig. III—in the direction of the arrows through spout 28 (Fig. I) by its own weight and under pressure from freshly mixed dough entering the mixing chamber 17 forcedly between the rollers 15 and 16. (Fig. II.)

It is to be observed that flour mixed in this manner into a dough receives a considerably better scientific treatment than the dough mixed in the old manner, as each particle of flour in passing through a vaporized brine is met by a well proportioned particle of that brine to which it clings and which it absorbs. The brine—so-called,—or mass, which often is of a glutinous nature not easily fused—as in whites of eggs—is also not readily fused in flour and requires considerable kneading in the old manner to bring about a breaking-up of its mass. It is also to be observed that with the new invention a perfect fusion is obtained in atomizing such brine or glutinous mass, as may be, before it comes into contact with the flour; thus a dough of exceptionally nutritious quality is obtained and more economically.

It is obvious that the mixer shown and herein described might be used for mixing other material than the ones herein mentioned; it is also obvious that various changes may be resorted to in the form, construction and arrangement of the several parts, or in the order of function of its units, or in the order of mixing, or consistency of the ingredients without departing from the spirit and scope of my invention, and hence I do not wish to limit myself strictly to the structure herein shown and described, but

What I claim is:

1. A method of preparing dough comprising passing flour across a path of atomized liquid to form a pasty mass, compressing and then kneading the mass progressively.

2. A method of preparing dough comprising causing flour to move continuously across a path of atomized liquid in a relatively confined space to form a pasty mass, introducing an ingredient into the mass while it is in motion, kneading the mass in a relatively unconfined space beneath the confined space, and then progressively ejecting the kneaded mass.

3. A dough preparing machine comprising in combination, a flour container, a dough kneading device, means for directing flour from the container to said device, and other means interposed in the path of the moving flour for ejecting atomized liquid into the flour to form a pasty mass, and mechanism for urging the mass into said device.

4. A dough preparing machine comprising in combination, a flour container, a delivery chute leading downwardly therefrom, means for ejecting atomized liquid into the chute intermediate the ends thereof and in the same direction as the path of travel of the flour, whereby a pasty mass may be ejected from the chute, means for progressively kneading the mass as it is delivered from said chute, and a movable closure for the kneading means, said closure functioning to urge the pasty mass into the kneading means.

5. A dough preparing machine comprising in combination, a flour container, a delivery chute, means for ejecting atomized liquid into flour passing through the chute to form a pasty mass, there being an enlarged chamber below the chute into which the pasty mass may be ejected from the chute, means within the chamber for compressing the mass and a kneading device beneath said last mentioned means for kneading the compressed material progressively, and for ejecting it in the form of prepared dough.

6. A dough preparing machine comprising in combination, a flour container, a delivery chute leading therefrom, means for ejecting atomized liquid into the flour near the outlet end of the chute whereby a pasty mass is ejected from the chute, a kneading chamber beneath the outlet of the chute, a pair of cooperating rolls for compressing the pasty mass and forcing it into the kneading chamber, a rotatable member within said chamber for kneading the compressed mass, and means for actuating said rolls and members, whereby dough may be mixed and kneaded progressively and ejected continuously in a prepared state.

7. The method of progressively preparing dough, comprising mixing a liquid with air under pressure, causing flour to move continuously through a chute, ejecting the mixture of liquid and air into the flour within the chute so as to form a pasty mass, kneading the mass beyond the end of the chute, and then progressively ejecting the kneaded mass.

8. A dough preparing machine, comprising in combination, a flour container, a delivery member leading therefrom, means for ejecting liquid into the flour in a direction substantially transversely to the direction of flour movement, means for ejecting air under pressure into the member and in a general direction of flour movement, the air being introduced directly above the point of entry of the liquid, whereby the flour is aerated and is converted into a pasty mass, and means below the member for kneading the mass, said means being arranged to progressively eject the kneaded mass.

In testimony, that I claim the foregoing as my invention, I have signed my name this 26th day of December, 1925.

MAXIMILIAN J. OCHES.